(12) United States Patent
Luppi

(10) Patent No.: US 11,371,640 B2
(45) Date of Patent: Jun. 28, 2022

(54) THREADED PLUG AND PROTECTIVE ELEMENT FOR A PLUG

(71) Applicant: POLYKAP S.R.L., Falciano (SM)

(72) Inventor: Davide Luppi, Borgo Maggiore (SM)

(73) Assignee: POLYKAP S.R.L., Falciano (SM)

( * ) Notice: Subject to any disclaimer, the term of this patent is extended or adjusted under 35 U.S.C. 154(b) by 0 days.

(21) Appl. No.: 16/952,302

(22) Filed: Nov. 19, 2020

(65) Prior Publication Data

US 2021/0199229 A1 Jul. 1, 2021

(30) Foreign Application Priority Data

Nov. 29, 2019 (IT) .................. 102019000022485

(51) Int. Cl.
*F16L 55/11* (2006.01)
*F16L 57/00* (2006.01)

(52) U.S. Cl.
CPC ......... *F16L 55/1108* (2013.01); *F16L 57/005* (2013.01)

(58) Field of Classification Search
CPC .......... F01M 2011/0416; F01M 11/04; F01M 11/0408; F16B 23/0038
USPC .... 138/89, 90; 411/383, 410, 373, 375, 402, 411/403, 396; 335/302; 251/215
See application file for complete search history.

(56) References Cited

U.S. PATENT DOCUMENTS

| | | | | |
|---|---|---|---|---|
| 1,634,655 A | * | 7/1927 | Elstone | F22B 37/223 220/304 |
| 3,812,757 A | * | 5/1974 | Reiland | F16B 31/021 411/5 |
| 4,189,976 A | * | 2/1980 | Becker | F16B 23/0092 411/396 |
| 4,759,672 A | * | 7/1988 | Nilsen | A47G 3/00 411/375 |
| 4,948,319 A | | 8/1990 | Day et al. | |
| 5,338,141 A | * | 8/1994 | Hulsey | F16B 33/008 411/369 |
| 5,395,196 A | * | 3/1995 | Notaro | F16B 35/00 411/373 |
| 2004/0197161 A1 | * | 10/2004 | Gonzalez | F16B 43/001 411/383 |

(Continued)

FOREIGN PATENT DOCUMENTS

CN 107725140 A 2/2018
WO 2008070732 A2 6/2008

OTHER PUBLICATIONS

Italian Search Report dated Aug. 14, 2020 from counterpart Italian Patent Application No. 201900022485.

(Continued)

*Primary Examiner* — Patrick F Brinson
(74) *Attorney, Agent, or Firm* — Shuttleworth & Ingersoll, PLC; Timothy Klima

(57) ABSTRACT

A threaded plug includes a structure which extends along an axis and includes a head, a body provided with an outer thread, and a clamping flange inserted between the head and the body; wherein the head includes, along the axis, at least one first portion having an outer lateral surface which features a first profile and at least one second portion having an outer lateral surface which features a second profile which is not coincident with the first profile.

17 Claims, 3 Drawing Sheets

(56) References Cited

U.S. PATENT DOCUMENTS

| | | | |
|---|---|---|---|
| 2008/0128206 A1* | 6/2008 | Wilkins | F01M 11/0408 |
| | | | 184/1.5 |
| 2011/0116892 A1* | 5/2011 | Wilson | F16B 23/0038 |
| | | | 411/372.5 |
| 2012/0187121 A1* | 7/2012 | Lu | B25B 15/008 |
| | | | 220/212 |

OTHER PUBLICATIONS

European Search Report dated Apr. 21, 2021 from counterpart European Patent Application No. 20000418.

* cited by examiner

THREADED PLUG AND PROTECTIVE ELEMENT FOR A PLUG

This application claims priority to Italian Patent Application IT102019000022485 filed Nov. 29, 2019, the entirety of which is incorporated by reference herein.

BACKGROUND OF THE INVENTION

This invention relates to a threaded plug, in particular for use in industry. This invention also relates to a protective element for a plug.

For general use in industry there are prior art threaded plugs, usually made of plastic material, capable of being inserted with forced screwing and tightening in a hole of a generic recipient component. Such plugs are used for the most diverse purposes, including, for example, that of closing holes, of protecting them from any damage, of covering them for functional or aesthetic reasons, of sealing them, of marking them, of making them hermetic, etc.

A prior art type of plugs comprises a monolithic structure, which develops along a longitudinal axis, in which three fundamental parts are essentially identifiable: a body, a flange and a head, parts which are placed one after another longitudinally to the axis.

The body of the plug is substantially cylindrical, is hollow inside, and is equipped with a profile wall in which an outer thread is made which is intended to couple with a suitable thread in contrast made inside the recipient hole for the plug.

The flange is essentially ring-shaped, and is inserted between the body and the head, jutting out relative to them and projecting transversally to the axis of the plug. During use of the plug the flange is intended to abut a part of the surface of the component surrounding the hole, applying to it a pushing action as a consequence of the screwing, the pushing action being stronger the higher the tightening torque used to forcibly screw the plug into the hole is.

The head takes the form of a tubular solid with prismatic profile, which develops for a short axial length, projecting from the flange on the opposite side to the body. The tubular solid is provided with a spacious inner cavity which, laterally, is surrounded by a thick wall, having the shape of a closed ring and having a uniform and constant thickness. The inner cavity is also equipped with a closed end, formed by the flange itself.

In the prior art plugs the head is provided with various types of coupling surfaces on which to engage a maneuvering tool for screwing or unscrewing the plug. First coupling surfaces are identified on the faces of the outer surface of the ring-shaped wall of the tubular solid; second coupling surfaces are in contrast on prominent projections contained inside the cavity.

More specifically, the outer first surfaces are substantially orthogonal to the lying plane of the flange and are shaped and sized in such a way that they can couple with a maneuvering tool which is for example an open-end wrench or a socket wrench, standardized, of standard production and normally used for tightening steel bolts. The maneuvering tools indicated above always operate by surrounding from the outside the outer surface of the tubular body of the head.

The second coupling surfaces, in contrast on the parallel projections inside the cavity, in contrast in combination with each other delimit an inserted seat or crack in which a further type of maneuvering tool can engage, again of standardized type for generic uses, in that case being a screwdriver which may be engaged in the seat to apply the stress necessary to screw/unscrew the plug.

Industrial components which involve the use of these plugs may feature different threads. Generally for each thread there is a plug capable of being tightened with a specific tool. The tightening may generally occur in three different ways: by means of a hexagonal wrench, by means of a box end wrench or by means of a screwdriver. In an assembly line, when the component features plugs with different threads, the operator must therefore continuously change the tool depending on the plug to be screwed or unscrewed. This involves slowing of the assembly line.

SUMMARY OF THE INVENTION

The aim of this invention is to overcome that disadvantage by allowing the operator to screw or unscrew plugs which have different threads using the same tool.

According to this invention, a threaded plug is supplied having features as disclosed herein.

The presence of two portions positioned along the axis and having two profiles which do not coincide allows the use of more than one tool for tightening the same plug. Indeed a first tool having a first shape or size may act on the portion having the first profile, whilst a tool having a different shape or size may act on the portion having the second profile. Therefore, the operator will be able to use a single tool for tightening different plugs by acting on the first or on the second portion of the head of the plug.

According to one advantageous embodiment, the second portion features at least one cavity into which the head of a tool may be inserted. In this way it is also possible to use a tool such as a screwdriver to perform the tightening.

According to this invention, a protective element is also supplied having features as disclosed herein.

The presence of two portions having two profiles which do not coincide allows the use of the protective element for plugs with heads which are hexagonal or circular or circular with ribs (capable of being tightened with box end wrenches). Moreover the protective element may also be used for plugs having the head featuring two portions positioned along the axis having different profiles.

BRIEF DESCRIPTION OF THE DRAWINGS

Further advantages and features of this invention will be more apparent in the detailed description which follows, with reference to the accompanying drawings, which show an example, non-limiting embodiment, in which.

DESCRIPTION OF THE PREFERRED EMBODIMENTS

Figure 1:
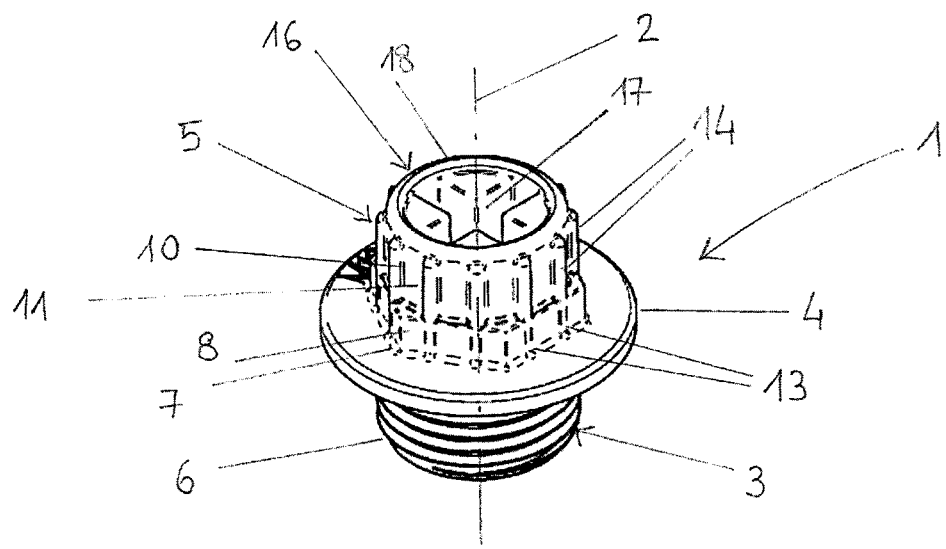
FIG. 1 is a perspective view which illustrates a preferred embodiment of the plug as a whole.

In FIG. 1 the numeral 1 denotes in its entirety a threaded plug 1, intended to be inserted with forced tightening in a hole made in a generic recipient component, not shown in the drawings. The plug 1 comprises a structure which extends along a longitudinal axis 2. The structure comprises a body 3, a flange 4 and a head 5, which are positioned in an orderly way continuing on from one another along the axis 2, with the flange 4 inserted between the body 3 and the head 5.

The body 3 is externally equipped with a thread 6, which shall be considered suitable for a matching inner thread of the hole of the recipient component for the plug 1. Preferably the body 3 is hollow inside.

Figure 4:
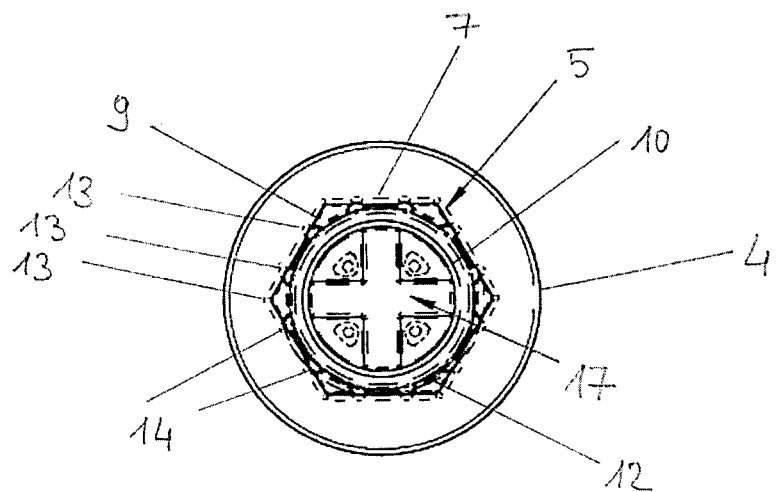
FIG. 4 is a top plan view of the plug of FIG. 1.
Figure 5:
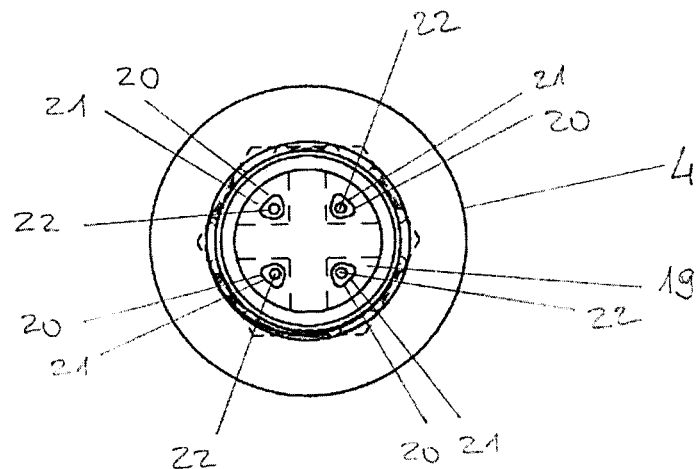
FIG. 5 is a bottom plan view of the plug of FIG. 1.

According to the invention, the head 5 comprises, along the axis 2, at least one first portion 7 having an outer lateral surface 8 which features a first profile 9 and at least one second portion 10 having an outer lateral surface 11 which features a second profile 12 which is not coincident with the first profile 9 (FIGS. 1 and 4).

In the embodiment illustrated, the first portion 7 and the second portion 10 are adjacent along the direction of the axis 2.

Figure 2:
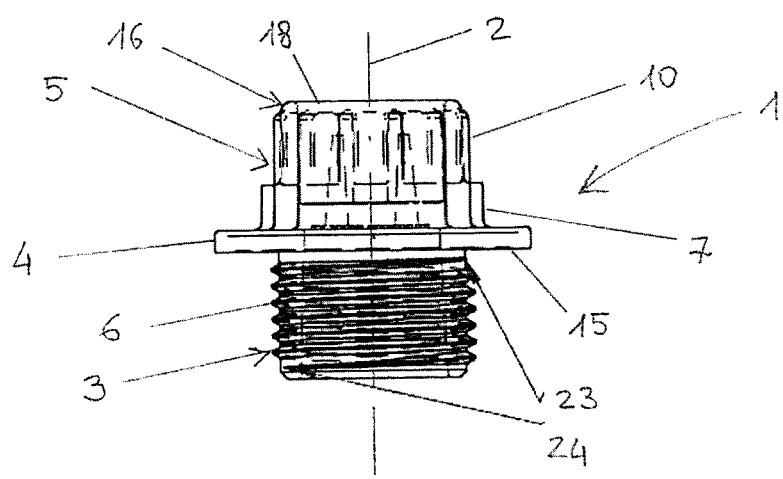
FIG. 2 is a front view of the plug of FIG. 1.
Figure 3:
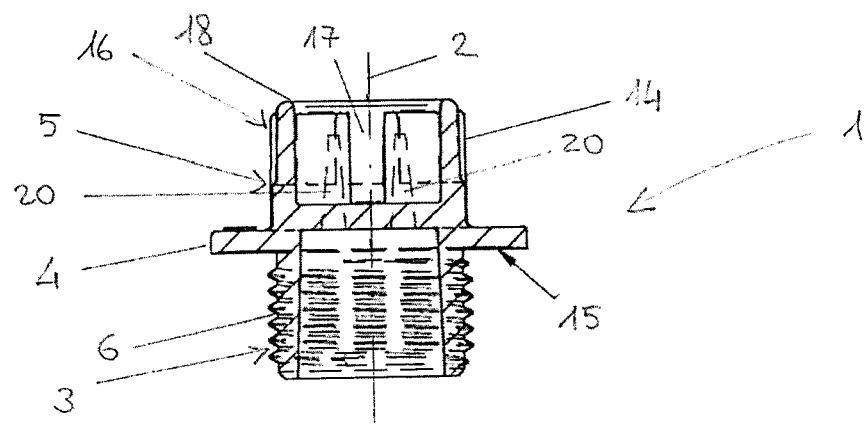
FIG. 3 is a longitudinal section of the plug of FIG. 1.

In particular, as illustrated in FIGS. 1 to 3, the first portion 7 extends from the flange 4 in a direction substantially parallel to the axis 2 of the plug 1.

In this way the flange 4 forms a supporting surface during tightening by means of use of a tool suitable for the first profile 9 of the outer lateral surface 8 of the first portion 7.

According to one advantageous embodiment, the flange 4 features a concavity or curve 15 towards the threaded body 3 of the plug 1 to increase adherence during tightening.

In one preferred embodiment, the outer lateral surface 8, 10 of the first portion 7 and/or of the second portion 10 of the head 5 is provided with at least one rib 13, 14 which develops in the direction of the axis 2. Preferably the outer lateral surface 8, 9 features a plurality of ribs 13, 14 which are distributed along the perimeter or the circumference of the surface 8, 11 itself. In the case of a circular profile the ribs are in particular uniformly distributed along the circumference and allow tightening by means of a box end wrench. In the case of a hexagonal profile, the ribs are in particular distributed on the sides of the hexagon to favor the tightening.

The two portions 7, 10 may have the lateral surface featuring the same profile, but different sizes, therefore allowing the use of two tools of the same type but with different sized head.

Advantageously the outer lateral surface 11 of the second portion 10 is positioned closer to the axis 2 of the plug 1 relative to the outer lateral surface 8 of the first portion 7 close to the flange 4. This means that the plug 1 is easy to make and facilitates the use of a tool suitable for the second profile 12 of the outer lateral surface 11 of the second portion 10, since during use the tool stops against the first portion 7.

In the preferred embodiment illustrated in FIGS. 1 to 5, the outer lateral surface 8 of the first portion 7 features a profile 9 different from the profile 12 of the outer lateral surface 11 of the second portion 10.

In particular, the first profile 9 is substantially polygonal, in particular hexagonal, and the second profile 12 is substantially circular.

The outer lateral surface 11 of the second portion 10 features a plurality of ribs 14 uniformly distributed along the circumference of the profile 12, in such a way that the plug can be tightened using a box end wrench.

Preferably, the substantially circular second profile 12 is inscribed in the polygon of the first profile 9. In this way it is possible to use either a box end wrench or a hexagonal wrench to tighten the same plug. For example, it is possible to use either a 16 mm (or ⅝") box end wrench which acts on the second portion 10 having substantially circular profile 12 and which rests on the first portion 7 with hexagonal profile 9 or a 17 mm hexagonal wrench which engages on the first portion 7 with hexagonal profile 9 making contact on the flange 4.

In the embodiment illustrated, the outer lateral surface 8 of the first portion 7 features a plurality of ribs 13 distributed along the perimeter of the profile 9. In particular, the ribs 13 are the extension of the ribs 14 distributed along the circumference of the profile 12. This allows the plug 1 to be tightened even with a box end wrench of a size greater than that corresponding to the diameter of the second portion 10, for example a 17 mm box end wrench. Indeed the box end wrench engages on the first portion 7 with hexagonal profile 9, making contact on the flange 4, and grips the ribs 13 during tightening.

Advantageously, the second portion 10 comprises the free end 16 of the head 5 of the plug 1 opposite to the flange 4. The second portion 10 features at least one cavity 17 into which the head of a tool may be inserted. In this way it is also possible to use a tool such as a screwdriver to perform the tightening.

In one preferred embodiment, the cavity 17 made in the second portion 10 is configured substantially in the shape of a cross. In this way for tightening it is possible to use either a flat blade screwdriver or a Phillips cross head screwdriver.

In the embodiment illustrated in FIGS. 1 to 5, the cavity 17 extends inside the second portion 10 as far as the first portion 7.

According to one preferred embodiment, the second portion 10 features at the opposite end 16 to the flange 4 a raised edge 18 which extends along the perimeter or the circumference of the lateral surface.

The plug is advantageously made in one piece from a single body.

In a first embodiment, the plug is made of plastic material.

In an alternative embodiment, the plug is made of metal material. The metal plug may be made for example with steel alloys or of aluminum. The metal plug is advantageously used in the mechanical industry sector, in particular in the hydraulic and car sector, since it allows an increase in the strength of the tightening torque. Moreover, the metal plug features electric conductivity.

The body 3 provided with an outer thread 6 is hollow and features an end 19 formed by the flange 4. As illustrated in particular in FIGS. 2 and 5, the end 19 features at least one hole 20 which passes through the flange 4 substantially in the direction of the axis 2 extending inside the first portion 7. Preferably the hole 20 extends partly in the solid part of the second portion 10 of the head 5. Advantageously, as illustrated in particular in FIGS. 4 and 5, the end 19 features four holes 20 which are positioned symmetrically relative to the axis 2 of the plug 1.

The hole 20 features a substantially triangular section 21 at the end 19 of the threaded body 3 and develops in an inclined way relative to the axis 2 of the plug 1, ending with a substantially circular section 22 having a size smaller than the triangular section 21. The presence of "gaps" in the head 5 of the plug 1 allows easier removal of the part from the mold.

Advantageously the thread 6 is inserted between two smooth cylindrical collars 23 and 24. The first collar 23 is adjacent to the flange 4, whilst the second collar 24 is made at one end of the body 3 far from the flange 4. The second collar 24 forms a guide to facilitate screwing the plug 1 into the corresponding hole without searching for the start of the thread. In use it is sufficient to start screwing the plug 1—whatever condition it is in—to make the thread automatically engage correctly, without any intervention by the assembler, after completing, at most, half a round angle.

This invention also relates to a protective element 25 for a plug. The protective element 25 is applied after fitting the plug on the component and is used during painting of the component to protect all of the parts of the plug which come into contact with the tool. That protective element 25 is removed after the painting and may be re-used.

Figure 6:
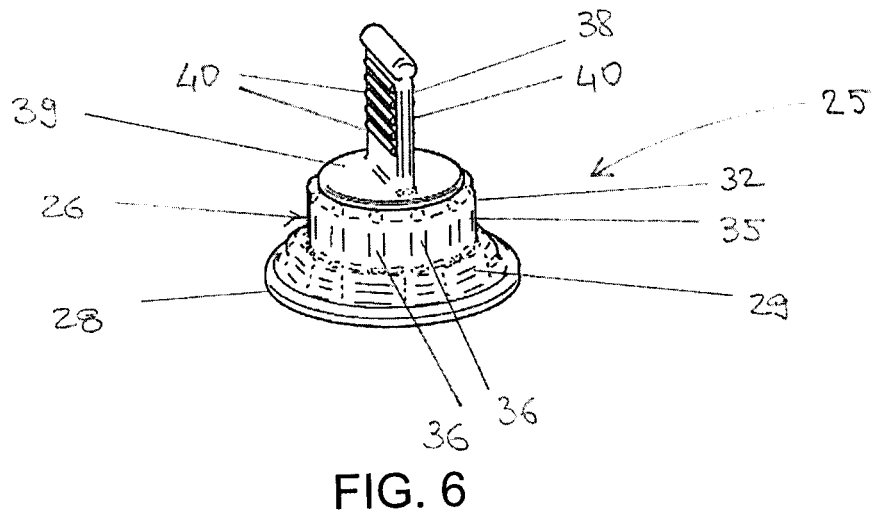
FIG. 6 is a perspective view which illustrates a preferred embodiment of a protective element for the plug.
Figure 7:
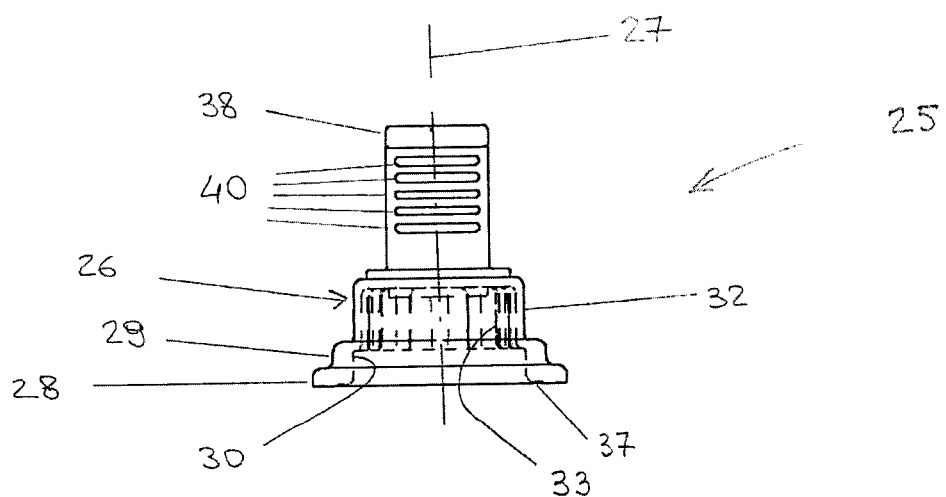
FIG. 7 is a front view of the protective element of FIG. 6.
Figure 8:
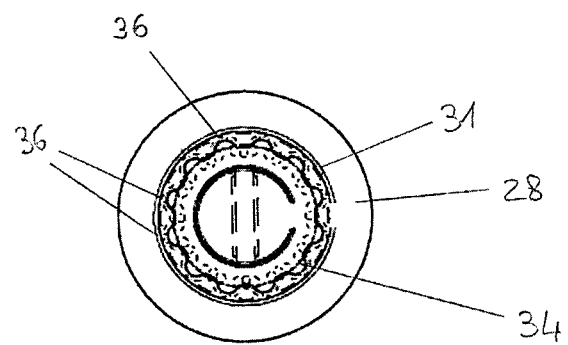
FIG. 8 is a bottom plan view of the protective element of FIG. 6.

FIGS. 6 to 8 illustrate a preferred embodiment of a protective element 25.

The protective element 25 comprises a hollow containment body 26 which extends along an axis 27 and is capable of containing the head 5 of the plug and a substantially ring-shaped base 28 capable of overlying the flange 4 of the plug 1.

According to the invention, the hollow containment body 26 comprises along the axis 27 at least one first portion 29 joined to the base 28 and having an inner lateral surface 30 which features a first profile 31 such as to allow the head 5 of the plug to pass and at least one second portion 32 having an inner lateral surface 33 closer to the axis 27 relative to the inner lateral surface 30 of the first portion 29 and which features a second profile 34 which is not coincident with the first profile 31.

Preferably, the first portion 29 and the second portion 32 are adjacent.

Advantageously the second profile 34 is capable of circumscribing the outer lateral surface of at least one portion of the head 5 of the plug 1.

In one embodiment not illustrated, the first profile 31 is substantially polygonal, in particular hexagonal, and the second profile 34 is substantially circular. In particular the inner lateral surface 31 of the second portion 32 features a plurality of recesses 36 which develop in the direction of the axis 27 of the hollow containment body 26 and which are distributed along the circumference of the second profile 34.

In one preferred embodiment, illustrated in particular in FIG. 8, the protective element 25 features a substantially circular first profile 31 with larger diameter and a substantially circular second profile 34 having a smaller diameter. In particular the inner lateral surface 31 of the second portion 32 features a plurality of recesses 36 which develop in the direction of the axis 27 of the hollow containment body 26 and which are distributed along the circumference of the second profile 34.

A protective element of this type may be applied to common plugs with heads which are polygonal or circular or circular with ribs. Moreover, the protective element 25 may be applied to plugs whose head features portions having profiles which are not coincident, such as the one illustrated in FIGS. 1 to 5.

In this case, in one preferred embodiment, the hollow body 26 of the protective element 25 comprises at least one first portion 29 having an inner lateral surface 30 which features a first profile 31 substantially coincident with or such as to circumscribe the first profile 9 of the outer lateral surface 8 of the first portion 1 of the head 5 of the plug 1 and at least one second portion 32 having an inner lateral surface 33 which features a second profile 34 substantially coincident with or such as to circumscribe the second profile 12 of the outer lateral surface 11 of the second portion 10 of the head 5 of the plug 1.

In one embodiment not illustrated, the protective element 25 features a hexagonal first profile 31 substantially coincident with the first profile 9 of the outer lateral surface 8 of the first portion 7 of the head 5 and a circular second profile 34 substantially coincident with the second profile 12 of the outer lateral surface 11 of the second portion 10 of the head 5.

In one advantageous embodiment, illustrated in FIGS. 6 to 8, the protective element 25 features a substantially circular first profile 31 capable of circumscribing the polygonal profile 9 of the outer lateral surface 8 of the first portion 7 of the head 5. This facilitates fitting of the protective element on the plug, avoiding the need to match the two hexagonal profiles to each other.

The ring-shaped base 28 preferably features a concavity or curve 37 directed towards the outside of the hollow body 26 to increase adherence to the flange 4 of the plug 1 and to prevent the passage of the paint.

In one preferred embodiment illustrated in FIGS. 6 and 7, the protective element 25 comprises a tab 38 joined to the end outer surface 39 of the second portion 32 of the hollow body 26. The tab 38, preferably having a rectangular shape, extends along the axis 27 of the hollow body 26. The tab 38 forms a grip element and in particular features projections 40 substantially perpendicular to the direction of extension of the tab 38 itself, preferably positioned on both sides.

Therefore, according to this invention a "universal" threaded plug is supplied, which may be screwed and unscrewed without having to change the tool. Moreover, a "universal" protective element is supplied, suitable for plugs with different shaped heads.

What is claimed is:

1. A threaded plug, comprising:
    a structure which extends along an axis and includes:
       a head,
       a body including an outer thread, and
       a clamping flange inserted between the head and the body;
    wherein the head comprises, along the axis, a first portion having an outer lateral surface which includes a first profile and a second portion having an outer lateral surface which includes a second profile which is not coincident with the first profile;
    wherein the first profile is substantially polygonal, and the second profile is substantially circular;
    wherein the outer lateral surface of the second portion includes a plurality of ribs which develop in a direction of the axis and are distributed along a circumference of the second profile.

2. The threaded plug according to claim 1, wherein the second portion is adjacent to the first portion in a direction of the axis.

3. The threaded plug according to claim 1, wherein the first portion extends from the clamping flange in a direction substantially parallel to the axis.

4. The threaded plug according to claim 1, wherein the second portion comprises a free end of the head.

5. The threaded plug according to claim 1, wherein the second profile is inscribed in the substantially polygonal first profile.

6. The threaded plug according to claim 1, wherein the second portion includes at least one cavity configured to receive a head of a tool.

7. The threaded plug according to claim 1, wherein the clamping flange includes a curve directed towards the body to increase adherence during tightening.

8. The threaded plug according to claim 1, made as a unitary structure.

9. The threaded plug according to claim 1, wherein the body is hollow and includes an end formed by the clamping flange, wherein the end includes at least one hole which passes through the clamping flange substantially in a direction of the axis, extending inside the first portion of the head.

10. A protective element for a plug comprising a head, a body, and a flange inserted between the head and the body, the protective element comprising:
   a hollow containment body which extends along an axis and which is capable of containing the head of the plug, and
   a substantially ring-shaped base capable of overlying the flange of the plug,
   wherein the hollow containment body comprises, along the axis, a first portion joined to the base and having an inner lateral surface which includes a first profile configured to allow the head of the plug to pass and a second portion having an inner lateral surface closer to the axis relative to the inner lateral surface of the first portion and which includes a second profile which is not coincident with the first profile;
   wherein the first profile of the hollow containment body is substantially coincident with or circumscribes a first profile of an outer lateral surface of a first portion of the head and the second profile of the hollow containment body is substantially coincident with or circumscribes a second profile of an outer lateral surface of a second portion of the head.

11. The protective element according to claim 10, wherein the second profile of the hollow containment body is capable of circumscribing the outer lateral surface of at least one chosen from the first portion and the second portion of the head.

12. The protective element according to claim 10, wherein the first profile of the inner lateral surface of the first portion of the hollow containment body is substantially circular.

13. The protective element according to claim 10, wherein the second profile of the inner lateral surface of the second portion of the hollow containment body is substantially circular.

14. The protective element according to claim 13, wherein the inner lateral surface of the second portion of the hollow containment body includes a plurality of recesses which develop in a direction of the axis of the hollow containment body and which are distributed along a circumference of the second profile.

15. The threaded plug according to claim 1, wherein the first profile is hexagonal.

16. A threaded plug, comprising:
   a structure which extends along an axis and includes:
      a head,
      a body including an outer thread, and
      a clamping flange inserted between the head and the body;
   wherein the head comprises, along the axis, a first portion having an outer lateral surface which includes a first profile and a second portion having an outer lateral surface which includes a second profile which is not coincident with the first profile;
   wherein the body is hollow and includes an end formed by the clamping flange, wherein the end includes at least one hole which passes through the clamping flange substantially in a direction of the axis, extending inside the first portion of the head.

17. A protective element for a plug comprising a head, a body, and a flange inserted between the head and the body, the protective element comprising:
   a hollow containment body which extends along an axis and which is capable of containing the head of the plug, and
   a substantially ring-shaped base capable of overlying the flange of the plug,
   wherein the hollow containment body comprises, along the axis, a first portion joined to the base and having an inner lateral surface which includes a first profile configured to allow the head of the plug to pass and a second portion having an inner lateral surface closer to the axis relative to the inner lateral surface of the first portion and which includes a second profile which is not coincident with the first profile;
   wherein the second profile of the inner lateral surface of the second portion of the hollow containment body is substantially circular;
   wherein the inner lateral surface of the second portion of the hollow containment body includes a plurality of recesses which develop in a direction of the axis of the hollow containment body and which are distributed along a circumference of the second profile.

* * * * *